(12) United States Patent
Guth et al.

(10) Patent No.: US 6,174,988 B1
(45) Date of Patent: Jan. 16, 2001

(54) USE OF POLYAMINO ACID SALTS IN WATER-BORNE ADHESIVE APPLICATIONS

(75) Inventors: Jacob J. Guth, Upper Black Eddy, PA (US); Niketa S. Lad, Parsippany, NJ (US); Carmine Iovine, Bridgewater, NJ (US); Mitchell Blumenthal, Belle Mead, NJ (US)

(73) Assignee: National Starch & Chemical Company, Bridgewater, NJ (US)

( * ) Notice: Under 35 U.S.C. 154(b), the term of this patent shall be extended for 0 days.

(21) Appl. No.: 09/287,901

(22) Filed: Apr. 7, 1999

(51) Int. Cl.⁷ .............................. C08G 69/08; B32B 7/12
(52) U.S. Cl. ..................... 528/319; 428/355 R; 528/328; 528/342; 525/419; 525/420
(58) Field of Search ................... 428/355 R; 528/319, 528/328, 342; 525/419, 420

(56) References Cited

U.S. PATENT DOCUMENTS

| | | | |
|---|---|---|---|
| 4,336,166 | 6/1982 | Penezuk et al. | 524/53 |
| 4,373,036 | 2/1983 | Chang et al. | 523/120 |
| 5,543,443 | 8/1996 | Rajaiah et al. | 523/120 |
| 5,597,930 * | 1/1997 | Wicks et al. | 548/314.1 |
| 5,674,947 * | 10/1997 | Oishi et al. | 525/289 |
| 5,961,965 * | 10/1999 | Kim et al. | 424/70.17 |

* cited by examiner

*Primary Examiner*—Yogendra Gupta
*Assistant Examiner*—Charles Boyer
(74) *Attorney, Agent, or Firm*—Richard R Muccino

(57) ABSTRACT

This invention relates to an adhesive composition which comprises (a) an adhesive carrier, and (b) an adhesively effective amount of a polyamino acid salt selected from the group consisting of polyaspartic acid salts, polyglutamic acid salts, and copolymers of polyaspartic acid salts with polyglutamic acid salts, and mixtures thereof. The present invention also pertains to an article to which the adhesive composition has been applied, a method for adhering a first substrate to a second substrate employing the polyamino acid salts, and to an improved method for making polyamino acid salts.

25 Claims, No Drawings

USE OF POLYAMINO ACID SALTS IN WATER-BORNE ADHESIVE APPLICATIONS

FIELD OF THE INVENTION

This invention relates to an adhesive composition which comprises (a) an adhesive carrier, and (b) an adhesively effective amount of a polyamino acid salt selected from the group consisting of polyaspartic acid salts, polyglutamic acid salts, and copolymers of polyaspartic acid salts with polyglutamic acid salts, and mixtures thereof. The present invention also pertains to an article to which the adhesive composition has been applied, a method for adhering a first substrate to a second substrate employing the polyamino acid salts, and to an improved method for making polyamino acid salts.

BACKGROUND OF THE INVENTION

Hot-melt adhesives are nonvolatile thermoplastic polymers that are heated to a melt and then applied as a liquid to a substrate. The adhesive bond forms when the thermoplastic polymer cools and resolidifies. Desirable hot-melt adhesive formulations provide good physical properties over a wide range of temperatures. Compounded thermoplastic polymers include ethylene-vinyl acetate copolymers, paraffin waxes, polypropylene, phenoxy resins, styrene-butadiene copolymers, ethylene-ethyl acrylate copolymers, and low density polypropylene. Uncompounded thermoplastic polymers include polyesters, polyamides, and polyurethanes. Conventional additives, such as flexibilizers, plasticizers, tackifying agents, antioxidants, waxes, and fillers, are generally incorporated into the adhesive to improve the mechanical shock resistance and the thermal properties of the adhesive.

Problems with using hot-melt adhesives usually involve poor high temperature performance because thermoplastics tend to creep under load. These problems can be minimized by cross-linking after the adhesive has been applied, but not at the temperature at which the adhesive is kept liquid in the applicator. Adhesives providing high temperature performance tend to be the most brittle while room temperature curing adhesives tend to provide the lowest performance.

Solvent-based adhesives are usually elastomeric materials formed by solution of a high molecular weight polymer in an appropriate solvent. Rubber-based adhesives generally contain an elastomer, such as Neoprene (polychloroprene), to provide most of its strength. Starch adhesives in the form of amylose and amylopectin are often chemically modified such as by treatment with mineral acid to form a thin boiling starch, by treatment with an oxidizing agent to form a starch having reduced chain associations, or by esterification to provide novel starch derivatives. Cellulosic adhesives are obtained by modification of cellulose such as by nitration to provide cellulose nitrate, by esterification to provide esters such as cellulose acetate, by ethoxylation to provide hydroxyethylcellulose, or by etherification to provide ethers such as methylcellulose.

Tackifying resins are useful in modifying many different types of adhesives and include abietic acid and pimaric acid, which are modified by heating to induce disproportionation, by reaction with alcohols to provide esterified products, and by reaction with various catalysts to hydrogenate or polymerize the material; aromatic resins such as coumarone-indene resins; chemicals such as indene or methylindene polymerized with styrene or methylstyrene to provide aromatic tackifying resins; and aliphatic hydrocarbon tackifying resins obtained by polymerizing cis- and trans-1,3-pentadiene, and isoprene and dicylopentadiene.

Protein-based adhesives are derived from blood, fish skin, casein, soybeans, animal hides, bones, and connective tissue. Cross-linking methods include insolubilization by denaturation. A typical formula for a protein-based adhesive includes a natural protein solubilized by reaction with sodium hydroxide, and then dispersed in water. This dispersed protein is then mixed with a defoamer, hydrated lime (cross-linking agent), sodium silicate, various chemical denaturants, and biocides. Depending upon the formulation, the pot life of the adhesive can be from several hours to several days.

While there are many disclosures that describe the preparation of adhesive compositions, none of the disclosures describe methods that are entirely satisfactory for preparing adhesive compositions. None of the disclosures describe the preparation of water-borne adhesive compositions that can be reproducibly prepared and are biodegradable and environmentally friendly. The present invention provides such improved water-soluble, biodegradable, adhesive compositions without the disadvantages characteristic of previously known compositions.

SUMMARY OF THE INVENTION

This invention relates to an article, having applied to a portion thereof, an adhesive composition, wherein the adhesive composition comprises:

(a) an adhesive carrier; and
(b) an adhesively effective amount of a polyamino acid salt selected from the group consisting of polyaspartic acid salts represented by Formula (1):

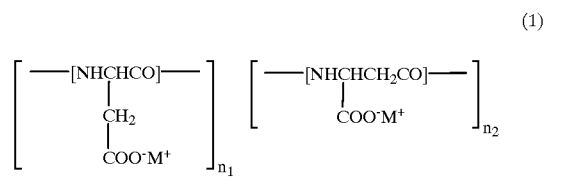

polyglutamic acid salts represented by Formula (2);

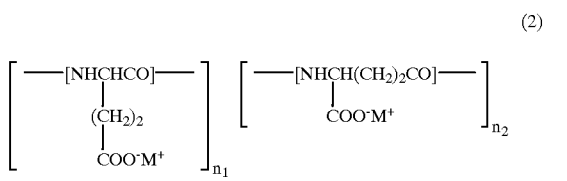

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quatemary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

This invention also pertains to an adhesive composition which comprises:

(a) an adhesive carrier; and (b) an adhesively effective amount of a polyamino acid salt selected from the group consisting of polyaspartic acid salts represented by Formula (1):

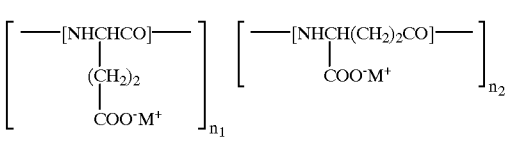

polyglutamic acid salts represented by Formula (2);

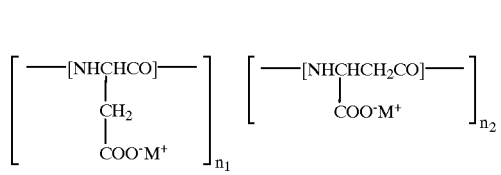

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_{4+}$ cations present in a ratio from about 25:75 to about 80:20, respectively; monovalent and multivalent organic quaternary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

This invention also pertains to a method for adhering a first substrate to a second substrate which comprises the steps of:

(a) contacting a first substrate with an aqueous solution of a polyamino acid salt;

(b) contacting the first substrate from step (a) with a second substrate;

wherein the polyamino acid salt is selected from the group consisting of polyaspartic acid salts represented by Formula (1):

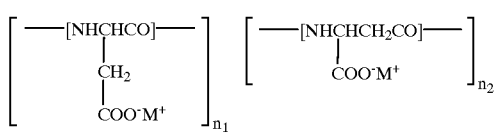

polyglutamic acid salts represented by Formula (2);

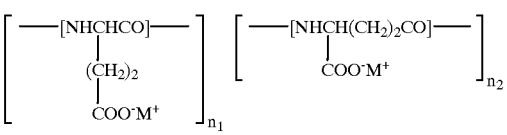

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quaternary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

This invention also pertains to a method for making a polyaspartic acid salt which comprises the steps of:

(a) passing sodium polyaspartate through an acid ion exchange column to form polyaspartic acid;

(b) collecting the polyaspartic acid effluent having a pH of <2; and (c) neutralizing the polyaspartic acid effluent with a base to form the polyaspartic acid salt.

DETAILED DESCRIPTION OF THE INVENTION

In one embodiment, the present invention is directed to the use of polyamino acid salts as hot melt adhesive agents. Applicants have found that concentrated aqueous solutions of polyamino acid salts of differing molecular weights can be heated, pumped, and applied to a variety of substrates in bead form to provide very desirable hot melt adhesive formulations. A deficiency of hot melt adhesive formulations is that the thermoplastic bond formed is somewhat reversible and has a tendency to creep under heavy load, especially as the softening temperature is reached. Applicants have found that although the polyamino acid salts of the present invention can be applied at temperatures below 100° C., the resulting bond is much more thermally stable than those of typical hot melts, e.g. >200° C. versus approximately 55° C. for standard hot melts. Because of the unique and unexpected properties of the polyamino acid salts, the polyamino acid salts can be used in applications not previously attainable by water-borne adhesive compositions. In addition, the polyamino acid salt adhesive agents are polypeptides and are therefore biodegradable.

The set time of the adhesive bead formed from the polyamino acid salts of the present invention is dependent upon the type of polyamino acid salt, the molecular weight of the polyamino acid salt, the temperature of the application, and the concentration of the polyamino acid salt employed, and can be set as the application demands. In general, the multivalent salts of polyaspartic acid show good adhesive properties. Multivalent salts of polyaspartic acid, such as zinc and calcium salts, are more hydrophobic than monovalent salts of polyaspartic acid, such as sodium and ammonium salts, and accordingly the multivalent salts generally have improved water resistance over that of the monovalent salts. Because the multivalent salts can form electrostatic cross-linkages, the multivalent salts tend to be of higher apparent molecular weight and have greatly improved fiber tear and set times than that of the monovalent salts. For certain applications, however, mixed salts, in which a portion of the less water-soluble multivalent cations is replaced with a portion of the more water-soluble monovalent cations, are more useful. While the multivalent polyamino acid salts tend to exist in water as viscous gel-like solutions of 40+% actives, which cannot be further diluted, the mixed multivalentmonovalent salts can be diluted to very low levels or concentrated to very high levels, >65% actives.

The polyamino acid salts of the present invention exhibit good adhesion to glass and can be used in bottle labeling applications. Moreover, the polyaspartate adhesive can readily be dissolved by washing the bottle with caustic solution thereby completely removing the label. When improved water resistance is required, mixed calcium/ammonium salts of polyaspartate may be employed. In this case, advantage is taken of the "fugitive amine effect", in which case, over an extended period of time, the ammonia volatilizes off, leaving the polyaspartate moiety with no choice but to bind more tenaciously with the cations in the glass itself. The result is a stronger and more waterproof bond. The remoistenable properties of the films formed from the simple or mixed polyaspartic salts also lend themselves to envelope, label, and letter applications. The films of the polyamino acid salts can be plasticized with hydrophilic moieties such as propylene glycol or glycerin to provide the desired flexibility. By careful selection of the type of polyamino acid salt employed, the polyamino acid salts of the present invention may be used as adhesives in these other areas: adhesives with anti-microbial properties, biodegradable adhesives for agriculture uses, toilet tissues and towels, powders, hot melts (cartons, boxes, etc.), furniture, wound healing adhesives, and paperbonding applications such as roll wrap and ream wrap, where repulpability is important.

In another embodiment, the present invention is directed to the use of polyamino acid salts as adhesive agents for agricultural use. Polyamino acid salts, such as polyaspartates, are highly biodegradable and the higher molecular weight salts, particularly the multivalent salts, demonstrate good adhesive properties. Moreover, once dried, the polyamino acid salt films have a high level of water resistance. Accordingly, the present invention is directed to the use of these biodegradable higher molecular weight polyamino acid salts as 1) adhesives to immobilize on the surface of a plant, such as on the leaves and stems, active ingredients such as anti-fungals, anti-microbials, insecticides, repellents, etc.; 2) adhesives to immobilize on the surface of a seed, active ingredients such as anti-fungals, innoculants, repellents, nematocides, etc.; and 3) adhesives to immobilize seeds onto various substrates, such as paper or cloth, for use as planting aids by treating the seed or the substrate with an aqueous solution of the biodegradable polyamino acid salt. Immobilizing an active ingredient onto a leaf, stem, or seed provides improved residence time of the active on the surface of the plant in a biodegradable and environmentally friendly manner. Immobilizing seeds on a substrate provides a novel delivery system for seeds which can be laid down as a strip, a tape, a mat, or blown into place in an environmentally and plant friendly manner. Use of the seed in the immobilized seed planting aid results in decreased germination time, increased rate of germination, and increased seedling survival, as well as reduced labor costs. The salts of the biodegradable polyamino acids for use as agricultural adhesive agents are preferably derived from calcium, magnesium, or mixed salts of calcium/sodium, calcium/ammonia, magnesium/sodium, and magnesium/ammonia. In addition, calcium, magnesium, and ammonium salts are known to be important in plant growth. Since zinc salts are know to possess anti-fungal activity, zinc, zinc/sodium, and zinc/ammonium polyaspartate salts provide useful vehicles for delivering zinc to the surface of a seed.

As set out above, the present invention is directed to an adhesive composition which comprises (a) an adhesive carrier; and (b) an adhesively effective amount of a polyamino acid salt selected from the group consisting of polyaspartic acid salts represented by Formula (1):

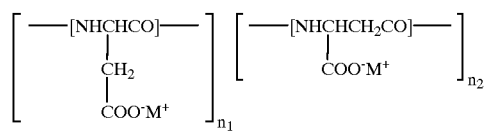

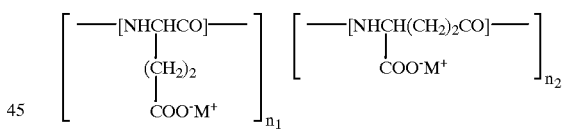

polyglutamic acid salts represented by Formula (2); and copolymers of the polyaspartic acid salts represented by Formula (1) with the polyglutamic acid salts represented by Formula (2), and mixtures thereof; wherein In Formula (1) and (2), $M^+$ is a monvalent or multivalent cation to neutralize or counter the carboxylate anion, and may be monovalent, divalent, or trivalent. Nonlimiting examples of suitable cations may be selected from the group consisting of monovalent and multivalent inorganic cations, monovalent and multivalent organic quaternary ammonium cations, and monofunctional and multifunctional amines. Preferred monovalent inorganic cations are selected from the group consisting of $H^+$, $Na^+$, $Li^+$, $K^+$, and $NH_4^+$. Preferred multivalent inorganic cations are selected from the group consisting of $Cu^{2+}$, $Ca^{2+}$, $Mg^{2+}$, $Ba^{2+}$, $Zn^{2+}$, and $Al^{3+}$. Preferred monovalent organic quaternary ammonium cations are represented by the formula, $^+N(CH_3)R_1R_2R_3$, wherein $R_1$, $R_2$, and $R_3$ are independently selected from the group consisting of branched and unbranched alkyl and alkenyl groups having from 1 to 30 carbon atoms. Preferred multivalent organic quaternary ammonium cations are represented by the formula, $^+N(CH_3)R_1R_2(CH_2)_p N^+(CH_3)R_1R_2$, wherein $R_1$ and $R_2$ are independently selected from the group consisting of branched and unbranched alkyl and alkenyl groups having from 1 to 30 carbon atoms, and p is an integer from 1 to 18. Preferred monofunctional amines are represented by the formula, $^+NHR_1R_2R_3$, wherein $R_1$, $R_2$, and $R_3$ are independently selected from the group consisting of hydrogen and branched and unbranched alkyl and alkenyl groups having from 1 to 30 carbon atoms. Preferred multifunctional amines are represented by the formula, $^+NHR_1R_2(CH_2)_p{}^+NHR_1R_2$, wherein $R_1$ and $R_2$ are independently selected from the group consisting of hydrogen and branched and unbranched alkyl and alkenyl groups having from 1 to 30 carbon atoms, and p is an integer from 1 to 18.

In a preferred embodiment, $M^+$ is a mixture of $Ca^{2+}$ and $Na^+$ cations present in a ratio from about 25:75 to about 95:5, preferably from about 35:65 to about 95:5, more preferably from about 40:60 to about 95:5, and most preferably from about 50:50 to about 90:10, respectively. In yet another preferred embodiment, $M^+$ is a mixture of $Zn^{2+}$ and $Na^+$ cations present in a ratio from about 25:75 to about 80:20, preferably from about 35:65 to about 80:20, more preferably from about 40:60 to about 80:20, and most preferably from about 45:55 to about 70:30, respectively. In still yet another preferred embodiment, $M^+$ is a mixture of $Ca^{2+}$ and $NH_4^+$ cations present in a ratio from about 25:75 to about 95:5, preferably from about 35:65 to about 85:15, more preferably from about 40:60 to about 80:20, and most preferably from about 45:55 to about 75:25, respectively. In still yet another preferred embodiment, $M^+$ is a mixture of $Zn^{2+}$ and $NH_4^+$ cations present in a ratio from about 25:75 to about 80:20, preferably from about 35:65 to about 80:20, more preferably from about 50:50 to about 80:20, and most preferably from about 45:55 to about 75:25, respectively. Polyamino acid salts containing the mixed salts in the above preferred embodiments have better solubility and better adhesive characteristics than polyamino acid salts containing a single salt.

Residues $n_1$, and $n_2$ in Formula (1) and (2) are present in random order. The ratio of $n_1$ to $n_2$ is from about 1:99 to about 99:1; preferably from about and 25:75 to about 75:25, and more preferably from about 30:70 to about 50:50.

The molecular weight of the polyamino acid salt in Formula (1) and (2) is from about 1,000 to about 100,000, preferably from about 4,000 to about 100,000, more preferably from about 30,000 to about 100,000 and most preferably from about 50,000 to about 100,000, (based on the molecular weight of the polyamino acid).

The adhesive carrier in the adhesive composition of the present invention may be selected from the group consisting of water, water/alcohol mixtures, water/glycol mixtures, and mixtures thereof. Preferably, the adhesive carrier is water.

Solubility of Polyaspartate Salts in Water-Alcohol Systems*

| Salt Type | Water/Alcohol Ratio |
| --- | --- |
| Sodium (100%) Polyaspartate | 66/34 |
| Ca/Na (25/75) Mixed Polyaspartate | 70/30 |
| Ca/Na (75/25) Mixed Polyaspartate | 94/6 |
| Ca/Na (90/10) Mixed Polyaspartate | >99/<1 |

*Polyaspartate salts were 30,000 Mw. A 10% solution (W/W) of polyaspartate in water was prepared and anhydrous alcohol added dropwise with stirring until permanent turbidity was observed. The ratio of water to alcohol was then calculated.

The amount of polyamino acid salt present in the adhesive compositions of the present invention is an adhesively effective amount, that is, an amount effective to impart adhesive properties required for use as a packaging adhesive. An adhesively effective amount of polyamino acid salt is that amount of polyamino acid salt necessary for the inventive composition to adhere a first substrate to a second substrate. The exact amount of polyamino acid salt is a matter of preference subject to such factors as the particular type of polyamino acid salt employed, the molecular weight of the polyamino acid salt employed, the temperature of the application, the resulting adhesive properties desired, as well as the particular application for which the adhesive may be used, i.e, substrate type, application, conditions, end-use. In a preferred embodiment, the polyamino acid salt in the adhesive carrier is present in an amount from about 5% to about 70%, preferably from about 10% to about 65%, and more preferably from about 30% to about 60%, by weight.

The precise formulation of the adhesive composition will vary depending upon the specific end use. Other ingredients may also be incorporated into the adhesive composition as dictated by the nature of the desired composition as well known by those having ordinary skill in the art. The adhesive compositions are readily prepared using methods generally known in the adhesive arts. Examples of additives traditionally used in packaging adhesives include plasticizers, defoamers, preservatives, thickeners, rheology modifiers, humectants, fillers, and tackifiers, which may be employed in conventional amounts.

Illustrative examples of plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. When present, plasticizers are generally used in amounts of 2 to 20 parts by weight, preferably 3 to 15 parts.

Illustrative examples of tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin. When present, tackifiers are generally used in dispersion form at 40% to 65% solids in amounts up to about 50 parts by weight, preferably 2 to 20 parts.

Illustrative examples of thickeners include oliginates, bentonite, casein, fumed silica, guar gum, gum tragacanth, hydroxy-ethylcellulose, locust bean gum, methylcellulose, polyacrylic acid salts (ammonium, potassium, sodium), polyvinyl alcohol, sodium carboxymethyl cellulose, and starches. When present, thickeners will be used in amounts up to about 25 parts by weight.

Illustrative examples of fillers include bentonites, calcium carbonate, calcium silicate, clay, mica, nut shell flours, silica, talc, uncooked starches, and wood flour. When present, fillers will be used in amounts up to about 20 parts by weight.

Illustrative examples of humectants include calcium chloride, diethylene glycol, glycerine, hexylene glycol, propylene glycol, magnesium chloride, sodium nitrate, sorbitol, sucrose, and urea. When present, humectants will be used in amounts up to about 20 parts by weight.

Surfactants are often employed in adhesive compositions to increase the penetrating effects of the adhesive. The surfactants may be one or more of anionic, cationic, amphoteric or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. One type of suitable non-ionic emulsifier is the addition product of 5 to 50 moles of ethylene oxide adducted to straight-chain and branched-chain alkanols with 6 to 22 carbon atoms, or to alkylphenols, higher fatty acids, higher fatty acid amines, or primary and secondary higher alkyl amines. Other suitable non-ionic emulsifiers are one or more block copolymers of propylene oxide with ethylene oxide. Preferred surfactants include fluorinated alkyl amphoterics or sodium dioctylsulfosuccinate. When present, the surfactant will be used in amounts of about 0.05 to 5.0 parts by weight.

The resultant waterborne adhesive compositions, when appropriately formulated, may be used as hot melt adhesives in virtually any packaging application in which adhesives are commonly employed with a substrate, including case and carton forming and sealing, tube winding, bag manufacture, glued lap, paper and flexible film laminating. Similarly, the waterborne adhesive compositions may be used in the agricultural area as biodegradable adhesive agents for immobilizing active ingredients onto leaves, stems, or seeds or immobilizing seeds onto a substrate. The substrates will have applied to a portion thereof the adhesive composition. Depending on the particular application, the substrate may have substantially all of one surface coated, or may be coated on two sides. Alternately, the adhesive composition may be applied as a bead, whereby a minor portion of the substrate has applied thereto the adhesive. One skilled in the art, having the knowledge of the present specification, will readily ascertain those applications in which the use of the inventive adhesive compositions would be advantageous. Any conventional method of applying the adhesives to the particular substrates may be employed. These methods are well known in the field of adhesives.

In a specific embodiment, the present invention is directed to an adhesive composition which comprises:

(a) an adhesive carrier; and (b) an adhesively effective amount of a polyamino acid salt selected from the group consisting of polyaspartic acid salts represented by Formula (1):

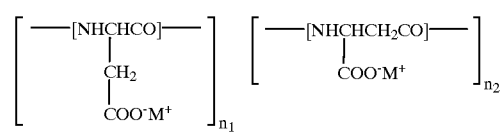

polyglutamic acid salts represented by Formula (2);

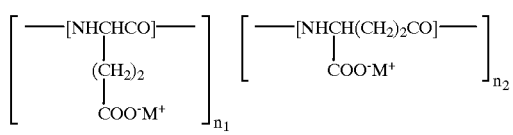

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_{4+}$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quaternary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

In another specific embodiment, the present invention is directed to a method for adhering a first substrate to a second substrate which comprises the steps of:

(a) contacting a first substrate with an aqueous solution of a polyamino acid salt;

(b) contacting the first substrate from step (a) with a second substrate; wherein the polyamino acid salt is selected from the group consisting of polyaspartic acid salts represented by Formula (1):

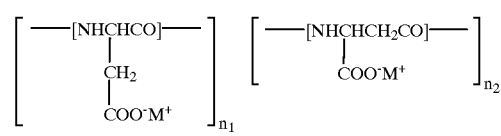

polyglutamic acid salts represented by Formula (2);

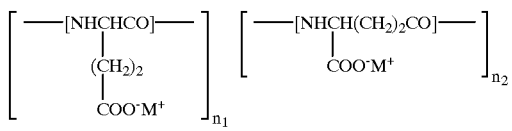

and copolymers of the polyaspartic acid salts represented by Formula (1) with the polyglutamic acid salts represented by Formula (2), and mixtures thereof; wherein
(i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quaternary ammonium cations; and monofunctional and multifunctional amines;
(ii) the ratio of $n_1$ to $n_2$ is from about 1:99 to about 99:1; and
(iii) the molecular weight of the polyamino acid salt is from about 1,000 to about 1,000,000.

Illustrative non-limiting examples of articles and first and second substrates for use with the polyamino acid salts in the present invention are set out below.

Hot Melt Applications

Hot (50° C. to 900° C.) concentrated solutions of polyamino acid salts can be pumped onto the surface of a variety of different materials and used to promote the adhesion of these substrates to other substrates, e.g., cardboard to cardboard (cardboard boxes), paper to leather (books), non-woven to non-woven (disposable surgical dressings, gowns), wood to wood (furniture), and the like.

Wound Healing Applications

Dilute solutions of multivalent and mixed polyamino acid salts can be used for wound healing to promote adhesion of various substrates, e.g., wound healing bandages and dressings such as non-wovens, cellulosic derived materials, skin, to skin and to other living tissue.

Tissue/Towel Applications

Dilute solutions of multivalent and/or mixed polyamino acid salts can be used in paper towel and toilet tissue applications. The salts can be used to promote adhesion between the initial sheet of paper towel or toilet tissue and the underlying roll or between the top most sheet of towel/tissue and the layer of towel/tissue immediately beneath.

Bottle Labeling Applications

Solutions of multivalent or mixed multivalent/ammonium salts can be used to promote adhesion of paper labels to glass and plastic (PET) bottles and containers.

Envelope Applications

Films cast from solutions of polyamino acid salts are remoistenable when dry. When plasticized appropriately, the films can be used to promote adhesion of the envelope flap to the rest of the envelope. Envelope seams can also be sealed using the polyamino acid salts.

Seed Coatings

Polyamino acid salts, particularly those using multivalent or mixed multivalent/ammonium, or multivalent/sodium cations, can be used to adhere active ingredients, such as fungicides, nematocides, insecticides, innoculants, and the like, to the surface of a seed, thus immobilizing these active ingredients and improving their on-seed residence time.

Seed Immobilization

Polyamino acid salts, particularly those using multivalent or mixed multivalent/ammonium, or multivalent/sodium cations, can also be used to immobilize seeds onto appropriate substrates, e.g., paper, cloth or plastic strips, to serve as a planting aid.

Pesticide/Fungicide/Herbicide/Repellent Immobilization

The residence time of herbicides, insecticides, fungicides, repellents, bactericides, and other active ingredients, typically applied to the leaves and stems of plants or to the coats or feathers of animals can be extended by inclusion of the appropriate polyamino acid salt into the formulation. Upon drying, the active ingredient typically is much more resistant to rub-off or to wash-off than is material to which the polyamino acid salt has not be added.

The present invention is further directed to novel polyamino acid salts selected from the group consisting of polyaspartic acid salts represented by Formula (1):

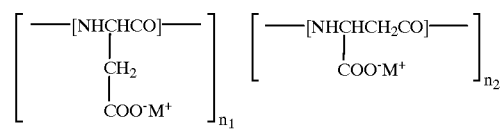

polyglutamic acid salts represented by Formula (2);

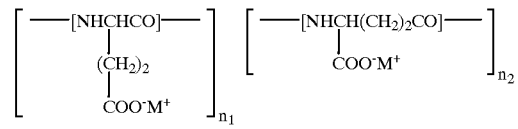

and copolymers of the polyaspartic acid salts represented by Formula (1) with the polyglutamic acid salts represented by Formula (2), and mixtures thereof. In Formula (1) and (2), (i) $M^+$ is a mixture of cations selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_{4+}$ cations present in a ratio from about 25:75 to about 80:20, respectively; (ii) the ratio of $n_1$ to $n_2$ is from about 1:99 to about 99:1; and (iii) the molecular weight of the polyamino acid salt is from about 1,000 to about 1,000,000.

The polyamino acid salts of the present invention can be prepared by various methods. In general, the desired polyamino acid salts represented by Formula (1) and (2) can be prepared by known procedures such as those disclosed in U.S. Pat. Nos. 4,839,461, 5,219,952, 5,288,783, and 5,478,919, which disclosures are incorporated herein by reference. To prepare the sodium salt of polyaspartic acid, various molecular weight aspartic acids or ammonium maleates are first condensed to yield polysuccinimide of appropriate molecular weight. The polysuccinimide product is then hydrolyzed to the sodium salt by heating the polysuccinimide with aqueous sodium hydroxide according to the scheme below:

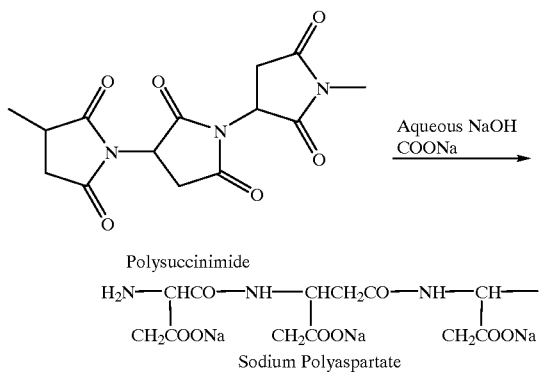

Polysuccinimide

H$_2$N—CHCO—NH—CHCH$_2$CO—NH—CH—
        |              |                 |
    CH$_2$COONa   CH$_2$COONa   CH$_2$COONa

Sodium Polyaspartate

Sodium polyaspartate can typically be prepared by the method at an actives levels of about 40%. The sodium salt can be concentrated by evaporation to an active levels of about 70% or dried to a solid and reconstituted in hot water. Other salts of polyaspartic acid can be prepared by hydrolyzing the polysuccinimide with different bases. Polyglutamic acid salts and copolymers of the polyaspartic acid salts with the polyglutamic acid salts can be prepared by analogous methods.

Applicants have discovered that salts of polyaspartic acid can be prepared by neutralizing polyaspartic acid with a base (inorganic or organic) according to the scheme below:

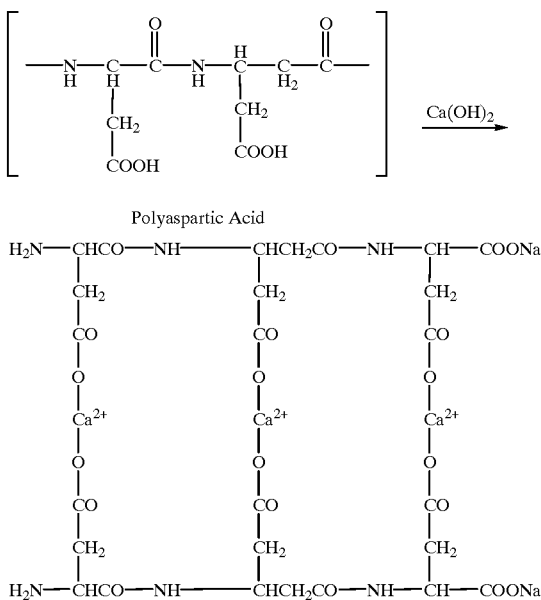

Polyaspartic acid can be prepared by passing sodium polyaspartate through an acid ion exchange column such as Amberlyst 15 and collecting the material issuing at a pH of <2. The advantage of this approach is that the precursor, polyaspartic acid, is highly water soluble, as opposed to the virtually water-insoluble polysuccinimide, and as a result enables a cleaner preparation of the multivalent salts of polyaspartic acid, particularly those prepared from bases of low water-solubility, e.g., zinc oxide and calcium hydroxide. Under the above conditions, multivalent salts of polyaspartic acid, e.g., calcium and zinc, typically fall out of aqueous solution as viscous oily liquids, at an actives level of >40% which can then be further concentrated, if desired, but not diluted. The above approach is particularly useful in the preparation of mixed polyamino acid salts, when it is desirable to achieve a high level of random distribution, of the chosen cations, along the polymer backbone.

In accord with the present invention, a preferred method for making a polyamino acid salt comprises the steps of:

(a) passing sodium polyaspartate through an acid ion exchange column to form polyaspartic acid;

(b) collecting the polyaspartic acid effluent having a pH of <2; and (c) neutralizing the polyaspartic acid effluent with a base to form the polyaspartic acid salt.

Throughout this application, various publications have been referenced. The disclosures in these publications are incorporated herein by reference in order to more fully describe the state of the art.

Throughout this disclosure, applicant will suggest various theories or mechanisms by which applicant believes the components in the adhesive compositions function together in an unexpected manner to provide unique waterborne hot melt agents. While applicant may offer various mechanisms to explain the present invention, applicant does not wish to be bound by theory. These theories are suggested to better understand the present invention but are not intended to limit the effective scope of the claims.

The present invention is further illustrated by the following examples which are presented for purposes of demonstrating, but not limiting, the preparation of the compounds and compositions of this invention.

EXAMPLES

Preparation of Calcium Polyaspartate From Polyaspartic Acid

Polyaspartic acid can be prepared by passing sodium polyaspartate, of the appropriate molecular weight, through a column containing an acidic ion exchange resin, such as Amberlyst-15. The effluent material issuing at a pH of <2, and preferably between 1.6 and 2.0, is collected. This aqueous solution of polyaspartic acid can either be freeze dried or vacuum dried for later use or may be converted immediately to the desired salt.

A dispersion of 11.533 g of Ca(OH)$_2$ (approximately 10% in water) was slowly added (dropwise) with vigorous stirring to 35.23 g of polyaspartic acid dissolved in 166.45 g of deionized water at room temperature. As the Ca(OH)$_2$ is added, the pH gradually rises, and the temperature and viscosity of the solution also gradually increase. At approximately pH 3.5, a brown oily liquid begins to form, the amount of which continues to increase until the Ca(OH)$_2$ addition is completed (approximately pH 7.0). Upon addition of all of the base, the reaction mixture is allowed to stand and a cloudy brown oil settles to the bottom with a clear aqueous supernatant above. The lower layer is collected, and warmed to 45–50° C. At this point, a small amount of a clear aqueous layer is observed above a clear tan to brown lower layer. The viscous lower layer (Viscosity @ room temperature: 3000 cP–4000 cP), which is an approximately 42–45% aqueous solution of calcium polyaspartate can then be used directly in adhesive applications or alternatively can be dried and reconstituted at a later date. Elemental analysis of the dried lower layer gave the following:

| Element | Theoretical | Found |
| --- | --- | --- |
| Calcium | 14.9 | 16.8 |
| Carbon | 35.8 | 32 |
| Hydrogen | 3.0 | 3.9 |
| Oxygen | 35.8 | 38 |
| Nitrogen | 10.4 | 9.3 |

Preparation of Zinc Polyaspartate From Polyaspartic Acid

A dispersion of 12.5 g of ZnO (approximately 10% in water) was slowly added (dropwise) with vigorous stirring to 35.44 g of polyaspartic acid dissolved in 164.91 g of deionized water at room temperature. As the ZnO is added, the pH gradually rises and the temperature and viscosity of the solution also gradually increase. At approximately pH 3.8, a brown oily appearing liquid begins to form, the amount of which continues to increase until the ZnO addition is completed. Upon addition of all of the base, the reaction mixture is allowed to stand and a cloudy brown oil settles to the bottom with a clear aqueous supernatant above. On standing at 45–50° C., the lower layer clears. Separation of the viscous lower layer (Viscosity @ room temperature: 4000–5000 cP) results in a product which is an approximately 45–48% aqueous solution of zinc polyaspartate which can then be used directly in adhesive applications or alternatively can be dried and reconstituted at a later date. Elemental analysis of the dried lower layer gave the following:

| Element | % Theoretical | % Found |
| --- | --- | --- |
| Zinc | 22.3 | 18.4 |
| Carbon | 32.8 | 29.7 |
| Hydrogen | 2.7 | 3.6 |
| Oxygen | 32.8 | 39.4 |
| Nitrogen | 9.6 | 8.9 |

In general, the calcium and zinc salts of polyaspartic acid showed good adhesive properties. However, for certain applications, the mixed salts, in which some of the less water-soluble divalent cations (calcium and zinc) were replaced with more water-soluble cations (sodium or ammonium ions) were found to more useful.

Preparation of Mixed Calcium/Sodium and Calcium/Ammonium Salts of Polyaspartic Acid A number of mixed salts were prepared in which the ratio of the divalent cation calcium to water-solubilizing sodium or ammonium varied from 25:75 to 90:10, respectively. A method for the preparation of a mixed calcium/sodium polyamino acid salt having a ratio 90:10 is given below and can be used as a general guide for the preparation of mixed calcium/sodium salts or calcium/ammonium salts or other calcium/sodium or calcium/ammonium ratios as well.

A quantity of 74.31 g of polyaspartic acid was dissolved in 348.69 g of deionized water at room temperature, whereupon 2.58 g of NaOH dissolved in 97.42 g of water was gradually added to it with vigorous stirring to form the partially neutralized sodium salt. A dispersion of 21.51 g of $Ca(OH)_2$ (approximately 10%) in water was slowly added (dropwise) with vigorous stirring to the polyaspartate solution. As the $Ca(OH)_2$ is added, the pH gradually increased, and the temperature and viscosity of the solution also gradually increased. Upon addition of all of the $Ca(OH)_2$ a clear tan to brown solution resulted. The resultant solution was dried to yield an off white to tan powder.

As compared to calcium polyaspartate, which in the presence of water exists (at 25° C.) as a viscous gel like solution of 40+% actives, the mixed calcium/sodium and calcium/ammonium salts can be diluted to infinitely low dilution levels or concentrated to levels of >65% actives. Thus the development of tack and the open time of the polymeric solution (adhesive solution) can be set as the application demands.

Preparation of Mixed Zinc/Sodium or Zinc/Ammonium Salts of Polyaspartic Acid

A number of mixed salts were prepared in which the ratio of divalent Zn to the water solubilizing sodium or $NH_4$ varied from 25:75 to 75:25. A method for the preparation of a mixed 70:30 Zn/sodium salt is given below and can be used as a general guide for the preparation of mixed Zn/sodium salts or Zn/ $NH_4$ salts of other ratios.

A quantity of 92.25 g of polyaspartic acid (0.8022 moles) was dissolved in 407.75 g of water following which 240.66 ml of 1N NaOH (0.3 molar equivalents) was added dropwise with stirring in order to form the partial sodium salt of polyaspartic acid. When addition of the NaOH solution was complete, dropwise addition of a 10% aqueous dispersion of ZnO (22.85 g or 0.35 molar equivalents) was begun. Following the completion of the addition, the aqueous solution was dried and a tan to off white powder resulted.

As was the case with the mixed calcium salts, the mixed zinc salts had a much more versatile solubility range than did the zinc salts alone. Solutions of the mixed salts of almost infinitely low dilution up to 60+% in concentration could be obtained. As before, in this way solutions of widely varying tack and open time could be obtained.

Films cast from solutions of multivalent salts of polyaspartic acid are more hydrophobic than are the sodium salts, e.g., (the zinc and calcium salts actually form 40+% aqueous gels from an aqueous solution) and because of the divalent character of these ions the viscosity of solutions of their salts is much higher.

| VISCOSITY OF POLYASPARTATE SALTS | | | |
| --- | --- | --- | --- |
| Cation Type | molecular weight | % Actives | Viscosity |
| Na | 30,000 | 70% | 1,000 cps |
| Na | 55,000 | 70% | 5,000 cps |
| Ca | 30,000 | 50% | 150,000 cps |
| Ca | 4,500 | 50% | 10,000 cps |
| Zn | 30,000 | 50% | 100,000 cps |

Adhesive Application of Polyaspartate Salts.

Hot Melt Applications

Very concentrated, hot aqueous solutions (>50% actives) of the various polyamino acid salts are extrudable and can be pumped onto a substrate, such as cardboard, and used to promote adhesion to another substrate in the same manner as a typical hot melt adhesive. A difference being that once a polyaspartate film or bead has set or dried, the resulting bond is quite thermally stable while a typical hot melt bond will fail at temperatures in excess of its melting point. Because of the opportunity for electrostatic crosslinkage, the apparent increase in molecular weight of the multivalent polyamino acid salts results in the resulting bond is quite thermally stable while a typical hot melt bond will fail at temperatures in excess of its melting point. Because of the opportunity for electrostatic crosslinkage, the apparent increase in molecular weight of the multivalent polyamino acid salts results in greatly improved fiber tear/set times for these materials over that observed for the monovalent salts.

% FIBER TEAR/SET TIMES FOR SODIUM POLYASPARTATE

| Mw | Conc. | <1 Min | 15 Min | 30 Min | 45 Min | 60 Min |
|---|---|---|---|---|---|---|
| 15,000 | 70% | No | No | No | No | No |
| 30,000 | 70% | No | 25% | 50% | — | 100% |
| 55,000 | 70% | No | 50% | — | — | 100% |

70% Actives at 90° C.

% FIBER TEAR/SET TIMES FOR CALCIUM POLYASPARTATE*

| Temp. | 1 Min | 2 Min | 5 Min | 10 Min | 15 Min | 30 Min | 60 Min |
|---|---|---|---|---|---|---|---|
| 60 deg | No | No | <25% | 75% | 75% | 100% | 100% |
| 70 deg | No | No | 50% | 100% | 100% | 100% | 100% |
| 80 deg | 75% | 75% | 100% | 100% | 100% | 100% | 100% |
| 90 deg | No | 50% | 75% | 100% | 100% | 50% | 50% |

Conc.--Approx. 50% molecular weight 30,000

% FIBER TEAR/SET TIMES FOR ZINC POLYASPARTATE*

| Temp °C. | 1 min | 2 min | 3 min | 4 min | 5 min | 10 min | 15 min | 30 min | 60 min |
|---|---|---|---|---|---|---|---|---|---|
| 70 | No | 25% | 50% | 50% | 75% | 75% | 100% | 100% | 100% |
| 80 | No | 75% | 50% | 50% | 50% | 75% | 75% | 100% | 100% |
| 90 | 50% | 75% | 75% | 75% | 75% | 75% | 75% | 100% | 100% |

Concentration--Approximately 52%

Bottle Labeling Applications

Polyamino acid salts exhibit good adhesion to glass and as a result can be used in bottle labeling applications. Moreover washing of the bottle with caustic solution results in rapid solubilization of the adhesive and complete removal of the label.

Glass Adhesion Properties Of Polyaspartate Salts

| MW | Polyaspartate type | % Fiber Tear 24 Hours | % Fiber Tear 7 Days |
|---|---|---|---|
| 15,000 | Na | 70% | 70% |
| 30,000 | Na | 70% | 100% |

An important measure of the effectiveness of an adhesive in a given application can be obtained by comparing the adhesive properties of tack time, drying time, and tack intensity (bond strength) of the material under evaluation, against that of other materials (standards) typically used in the particular application. Shown below is a comparison of various polyaspartate salts against casein, a milk protein, commonly used in bottle labeling applications. The data clearly shows the polyaspartate salts to have superior bond strength to that of the casein.

Tack and Drying Time Measurements For Polyaspartate Salts In Bottle Labeling Adhesives*

| Adhesive Candidate | Tack Time (secs) | Drying Time (secs) | Tack Intensity (gms) |
|---|---|---|---|
| $NH_4$ Casein-NZ | 392 | 392 | 5.5 |
| $NH_4$ Casein-US | 495 | 495 | 4.8 |
| Ca/$NH_4$ polyaspartate (90/10) | 371 | 593 | 14.7 |
| Ca/Na polyaspartate (90/10) | 526 | 670 | 17.5 |
| Na polyaspartate | 330 | 768 | 14.6 |
| Zn/Na polyaspartate (70/30) | 150 | 618 | 11.2 |

*Measurements were taken with a Diastron, an instrument which measures the force needed to separate two plates, one coated with the adhesive, which repeatedly are brought in contact with one another and then taken apart. Tack time is the time needed to achieve the maximum adhesion of the two plates. Drying time is the elapsed time from the initial application of the adhesive until the attractive force between the two plates has again decreased to a minimum. Tack intensity is a measure of the maximum attractive force between the two substrates. All polyasparate samples were 30,000 in molecular weight (Mn) based on sodium polyacrylate standards.

* Measurements were taken with a Diastron, an instrument which measures the force needed to separate two plates, one coated with the adhesive, which repeatedly are brought in contact with one another and then taken apart. Tack time is the time needed to achieve the maximum adhesion of the two plates. Drying time is the elapsed time from the initial application of the adhesive until the attractive force between the two plates has again decreased to a minimum. Tack Intensity is a measure of the maximum attractive force between the two substrates. All polyaspartate samples were 30,000 in molecular weight (Mn) based on sodium polyacrylate standards.

Envelope Applications

The remoistenable properties of the films cast from the simple or mixed salts of polyaspartic acid make them very useful as adhesives for various envelope and letter applications. Films of the above salts can be plasticized with either propylene glycol or with glycerin in order to yield the desired flexibility.

Tissue/Towel Applications

Polyamino acid salts can also be used to achieve adhesion of the first sheet of a tissue or towel to the cardboard roll or to achieve adhesion between the last sheet on the roll to the roll itself. A comparison of the tack time, drying time, and tack intensity data obtained for polyamino acid salts against some known adhesives typically used in tissue/towel applications clearly shows the efficacy of the polyamino acid salts in this application.

Tack and Drying Time Measurements of Polyaspartate Salts
Against Tissue/Towel Adhesives

| Adhesive Candidate | Tack Time (secs) | Drying Time (secs) | Tack Intensity (gms) |
|---|---|---|---|
| Polyvinyl pyrrolidinone | 412 | 443 | 53.3 |
| Polyvinyl alcohol | 495 | 495 | 12.6 |
| Ca/NH4 polyaspartate (90/10) | 371 | 593 | 14.7 |
| Ca/Na polyaspartate (90/10) | 526 | 670 | 17.5 |
| Na polyaspartate | 330 | 768 | 14.6 |
| Zn/Na polyaspartate (70/30) | 150 | 618 | 11.2 |

Immobilization of Seeds Onto Cheese Cloth

A 42% solution of calcium polyaspartate was applied to one side of a piece of cheese cloth (1'x 3' and weighing approximately 9 g), at a pickup level of approximately 50%. Grass seed (perennial rye grass) was applied to the treated surface of the cheesecloth, the cloth was then oven dried at 50° C. for 30 minutes and then allowed to air dry for several days. The cheesecloth was shaken to remove any loose seed and the cheesecloth was rolled up and set aside for several days to simulate storage conditions. After several days, the cloth was unrolled, placed in a tray of water (seed side down), covered lightly with soil, and the seeds allowed to germinate. Germination was uneventful and the grass grew quickly.

This approach could also be used to immobilize seeds onto a mat, and the mat subsequently laid down and used to deliver the seeds in a controlled way to the surface of the soil. Plasticization of the polyaspartate films with glycerin, propylene glycol, or some other environmentally friendly plasticizer has been found to promote better adhesion of the seeds to the substrate.

Immobilization of Seeds Onto Paper

A film from a 25% actives solution of 90/10 Ca/Na mixed polyaspartate salt (derived from Mw 30,000 polyaspartic acid), plasticized with 1% propylene glycol (by weight of polyaspartate) was applied to the surface of paper with a 3mil Bird Applicator. Perennial rye grass seed was then sprinkled onto the film before drying. Drying then took place in a forced air oven at 50° C. The resulting film was found to be fully flexible, and the grass seed was found to be effectively held to the surface of the paper. This approach could also be used to immobilize seeds onto a long strip of paper, cloth, or other substrate to form a tape which could then be rolled up for storage. The tape could then be unrolled at a later date and used to facilitate the planting process.

Immobilization of Active Agents Onto Plant Seeds, Leaves and Stems

The adhesive properties of the polyaspartate salts can be used to immobilize onto the surface of the plant seeds, stem, and leaves the active ingredients useful in agriculture. For these examples, finely ground charcoal (which was used as a mimic for the active ingredient) was bound to the surface of corn seeds using the adhesive properties of the polyaspartate salts. While the approach described below uses either Norit A (Matheson, Coleman & Bell) or Darco S-51 (ICI) activated charcoal, the same approach can be used to immobilize onto the surface of the plant seed, stem or leaves virtually any particulate, or other active ingredient used, used to promote a beneficial effect. To 1 g of a 70/30 Ca/Na polyaspartate salt (derived from Mw 30,000 polyaspartic acid) was added 9 g water and 0.01 g propylene glycol and 0.01g triethanolamine lauryl sulfate (Calfoam TLS-40 from Pilot Chemical Co). To this solution was added 40 g of corn seed. The mixture was stirred to insure that all seeds were evenly coated following which 1 g of charcoal was added, and the mixture again stirred. When all seeds were evenly coated, the mass was spread onto a pan and oven dried for 30 minutes at 50° C. Examination of the dried seeds showed considerably more charcoal to be present on the seed surface than was present on seeds treated only with an aqueous mixture of charcoal, moreover, the coating on the treated seeds was quite resistant to rub off.

While a number of embodiments of this invention have been represented, it is apparent that the basic construction can be altered to provide other embodiments which utilize the invention without departing from the spirit and scope of the invention. All such modifications and variations are intended to be included within the scope of the invention as defined in the appended claims rather than the specific embodiments which have been presented by way of example.

We claim:

1. An article, having applied to a portion thereof, an adhesive composition, wherein the adhesive composition comprises:

(a) an adhesive carrier; and (b) an adhesively effective amount of a polyamino acid salt selected from the group consisting of polyaspartic acid salts represented by Formula (1):

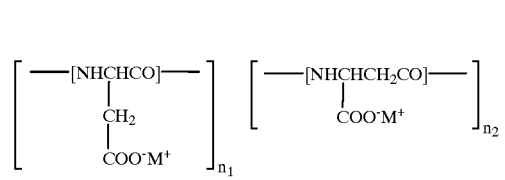

polyglutamic acid salts represented by Formula (2);

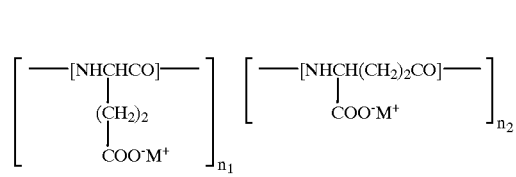

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^+$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quaternary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

2. The article according to claim 1, wherein $M^+$ is a mixture of $Ca^{2+}$ and $Na^+$ cations present in a ratio froout 25:75 to about 95:5, respectively.

3. The article according to claim 1, wherein $M^+$ is a mixture of $Zn^{2+}$ and $Na^+$ cations present in a ratio from about 25:75 to about 80:20, respectively.

4. The article according to claim 1, wherein $M^+$ is a mixture of $Ca^{2+}$ and $NH_4^+$ cations present in a ratio froout 25:75 to about 95:5, respectively.

5. The article according to claim 1, wherein $M^+$ is a mixture of $Zn^{2+}$ and $NH_4^+$ cations present in a ratio from about 25:75 to about 80:20, respectively.

6. The article according to claim 1, wherein the organic quatemary ammonium cation is selected from the group consisting of monovalent organic quatemary ammonium cations represented by the formula, $^+N(CH_3)R_1R_2R_3$, and multivalent organic quatemary ammonium cations represented by the formula, $^+N(CH_3)R_1R_2(CH_2)_p N^+(CH_3)R_1R_2$, wherein $R_1$, $R_2$, and $R_3$ are independently selected from the group consisting of branched and unbranched alkyl and alkenyl groups having from 1 to 30 carbon atoms and p is an integer from 1 to 18.

7. The article according to claim 1, wherein the amine is selected from the group consisting of monofunctional amines represented by the formula, $^+NHR_1R_2R_3$, and multifunctional amines represented by the formula, $^{+NHR}\!_1R_2(CH_2)_p{}^{+NHR}\!_1R_2$, wherein $R_1$, $R_2$, and $R_3$ are independently selected from the group consisting of hydrogen and branched and unbranched alkyl and alkenyl groups having from 1 to 30 carbon atoms and p is an integer from 1 to 18.

8. The article according to claim 1, wherein the polyamino acid salt in (b) is a polyaspartic acid salt represented by Formula (1).

9. The article according to claim 1, wherein the polyamino acid salt in (b) is a polyglutamic acid salt represented by Formula (2).

10. The article according to claim 1, wherein the polyamino acid salt in (b) is a copolymer of the polyastic acid salt represented by Formula (1) with the polyglutamic acid salt represented by Formula (2).

11. The article according to claim 1, wherein the article is selected from the group consisting of tissues, towels, bottle labels, envelopes, cardboard boxes, and wound healing dressings.

12. The article according to claim 1, wherein the article is a plant surface selected from the group consisting of stems, leaves, and seeds.

13. An adhesive composition which comprises:

(a) an adhesive carrier; and (b) an adhesively effective amount of a polyamino acid salt selected from the group consisting of polyaspartic acid salts represented by Formula (1):

(1)

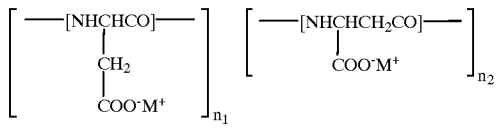

polyglutamic acid salts represented by Formula (2);

(2)

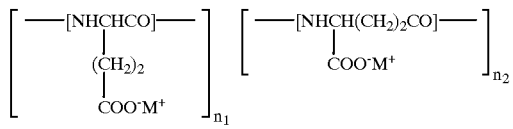

and copolymers of the polyaspartic acid salts represented by Formula (1) with the polyglutamic acid salts represented by Formula (2), and mixtures thereof; wherein (i) $M^+$ is selected from the group consisting of a mixture of $Ca^{2+}$ and $Na^+$ cations present in a ratio from about 25:75 to about 95:5, respectively; a mixture of $Zn^{2+}$ and $Na^{30}$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quatemary ammonium cations; and monofunctional and multifunctional amines;

(ii) the ratio of $n_1$ to $n_2$ is from about 1:99 to about 99:1; and (iii) the molecular weight of the polyamino acid salt is from about 1,000 to about 1,000,000.

14. The adhesive composition according to claim 13, wherein $M^+$ is a mixture of $Ca^{2+}$ and $Na^{30}$ cations present in a ratio from about 25:75 to about 95:5, respectively.

15. The adhesive composition according to claim 13, wherein $M^+$ is a mixture of $Zn^{2+}$ and $Na^{30}$ cations present in a ratio from about 25:75 to about 80:20, respectively.

16. The adhesive composition according to claim 13, wherein $M^+$ is a mixture of $Ca^{2+}$ and $NH_4^+$ cations present in a ratio from about 25:75 to about 95:5, respectively.

17. The adhesive composition according to claim 13, wherein $M^+$ is a mixture of $Zn^{2+}$ and $NH_4^+$ cations present in a ration about 25:75 to about 80:20, respectively.

18. The adhesive composition according to claim 13, wherein the organic quatemary ammonium cation is selected from the group consisting of monovalent organic quaternary ammonium cations represented by the formula, $^+N(CH_3)R_1R_2R_3$, and multivalent organic quaternary ammonium cations represented by the formula, $^+N(CH_3)R_1R_2(CH_2)_p N^+(CH_3)R_1R_2$, wherein $R_1$, $R_2$, and $R_3$ are independently selected from the group consisting of branched and unbranched alkyl and alkenyl groups having from 1 to 30 carbon atoms and p is an integer from 1 to 18.

19. The adhesive composition according to claim 13, wherein the amine is selected from the group consisting of monofunctional amines represented by the formula, $^+NHR_1R_2R_3$, and multifunctional amines represented by the formula, $^+NHR_1R_2(CH_2)_p{}^+NHR_1R_2$, wherein $R_1$, $R_2$, and $R_3$ are independently selected from the group consisting of hydrogen and branched and unbranched alkyl and alkenyl groups having from 1 to 30 carbon atoms and p is an integer from 1 to 18.

20. The adhesive composition according to claim 13, wherein the polyamino acid salt in (b) is a polyaspartic acid salt represented by Formula (1).

21. The adhesive composition according to claim 13, wherein the polyamino acid salt in (b) is a polyglutamic acid salt represented by Formula (2).

22. The adhesive composition according to claim 13, wherein the polyamino acid salt in (b) is a copolymer of the polyaspartic acid salt represented by Formula (1) with the polyglutamic acid salt represented by Formula (2).

23. A method for adhering a first substrate to a second substrate which comprises the steps of:
   (a) contacting a first substrate with an aqueous solution of a polyamino acid salt;
   (b) contacting the first substrate from step (a) with a second substrate;
   wherein the polyamino acid salt is selected from the group consisting of polyaspartic acid salts represented by Formula (1):

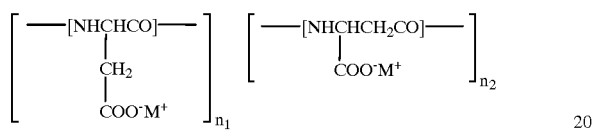

(1)

polyglutamic acid salts represented by Formula (2);

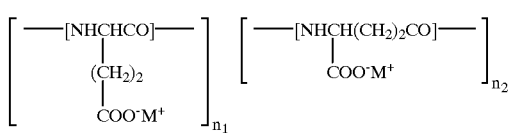

(2)

and copolymers of the polyaspartic acid salts represented by Formula (1) with the polyglutamic acid salts represented by Formula (2), and mixtures thereof; wherein
   (i) $M^+$ is selected from the group consisting of a mixture of $Ca^{2+}$ and $Na^{30}$ cations present in a ratio from about 25:75 to about 95:5, respectively; a mixture of $Zn^{2+}$ and $Na^{30}$ cations present in a ratio from about 25:75 to about 80:20, respectively; a mixture of $Ca^{2+}$ and $NH_4^+$ cations present in a ratio from about 25:75 to about 95:5, respectively; a mixture of $Zn^{2+}$ and $NH_4^+$ cations present in a ratio from about 25:75 to about 80:20, respectively; monovalent and multivalent organic quaternary ammonium cations; and monofunctional and multifunctional amines;
   (ii) the ratio of $n_1$ to $n_2$ is from about 1:99 to about 99:1; and
   (iii) the molecular weight of the polyamino acid salt is from about 1,000 to about 1,000,000.

24. The method according to claim 23, wherein the first substrate is selected from the group consisting of plant leaves and stems and the second substrate is selected from the group consisting of anti-fungals, anti-microbials, insecticides, herbacides, and repellents.

25. The method according to claim 23, wherein the first substrate is a plant seed and the second substrate is selected from the group consisting of anti-fungals, innoculants, repellents, anti-microbials, and nematocides.

* * * * *